(12) United States Patent
Bean et al.

(10) Patent No.: US 6,645,663 B2
(45) Date of Patent: Nov. 11, 2003

(54) LIFE EXTENDING BATTERY ADAPTER FOR MULTI-CHEMISTRY BATTERY SYSTEMS

(75) Inventors: Heather N Bean, Fort Collins, CO (US); Christopher A. Whitman, Fort Collins, CO (US); Matt Flach, Fort Collins, CO (US); Jerry Swinford, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 09/819,968

(22) Filed: Mar. 28, 2001

(65) Prior Publication Data
US 2002/0142212 A1 Oct. 3, 2002

(51) Int. Cl.[7] ............................................... H01M 2/10
(52) U.S. Cl. ........................... 429/99; 429/9; 429/8; 429/7; 429/100; 429/96; 429/97; 429/121; 429/123
(58) Field of Search ................................. 429/100, 121, 429/123, 96, 97, 7, 8, 9, 99

(56) References Cited

U.S. PATENT DOCUMENTS 5,187,026 A * 2/1993 Scrivano ...................... 429/96

FOREIGN PATENT DOCUMENTS

JP 03-152557 * 12/1992 ........... G03B/17/02

* cited by examiner

Primary Examiner—Patrick Ryan
Assistant Examiner—Angela J. Martin

(57) ABSTRACT

A life extending device, such as a capacitor, is optionally positioned to be electrically connected in parallel with a battery. In one embodiment, the life extending device is optionally inserted in a battery holder which is used in substitution for the original battery. The battery holder is designed for at least one AA battery and the battery being replaced is a lithium ion or lithium metal primary battery.

23 Claims, 1 Drawing Sheet

LIFE EXTENDING BATTERY ADAPTER FOR MULTI-CHEMISTRY BATTERY SYSTEMS

TECHNICAL FIELD

The present invention relates to auxiliary power and more specifically to a method and apparatus for optionally adding a battery life extension device to a battery source of power.

BACKGROUND

Certain devices, such as cameras and the like, contain batteries that are constructed to meet specific requirements. The chemistry of different battery types is designed to deliver the type of power demanded for specific operations. Basically, alkaline batteries and to a lesser degree lithium-iron disulfide and nickel metal hydride batteries, which typically come in the AA size, are very sensitive to high current loads and pulses. In other words, when a load is very high current, or high drain, the battery may deliver the load, but at the cost of total energy output over the battery's life. So, the general idea is to try to minimize high drains as much as possible to get more energy out of the batteries. Thus, for high current pulsed loads such as charging the strobe capacitor of a camera, batteries which are both high energy density and affected little in terms of capacity by high drains will provide the best battery performance. Thus, lithium metal primary batteries (lithium-manganese dioxide) are a typical choice for cameras (e.g., CR2, CR123, etc.) Digital cameras often use lithium ion rechargeable batteries for similar reasons.

Accordingly, film cameras typically come equipped with lithium batteries to maintain longer life, while digital cameras often favor lithium ion batteries for their small size and recharging ability. This presents a problem for a user when the battery is suddenly out of power in a location not convenient for the recharge or replacement of the proper battery which is some times hard to find. In such situations, it would be desirable for the user to be able to replace the lithium metal or lithium ion battery with an off the shelf AA battery having a traditional chemistry not particularly suited for instantaneously high energy demands.

When such AA batteries are used it would be further desirable for the camera, or other device using the battery, to have installed some mechanism for extending the life of the battery. Such mechanisms exist, for example in the form of a capacitor, which can be added to the electrical circuit to extend battery life. Such mechanisms are expensive and bulky and thus are not typically installed in a camera, except, perhaps, in some top of the line equipment.

Thus, it is desired to employ an electrical supply system which will accept batteries having different chemistries with systems that can operate to maximize the life of the battery type currently installed.

SUMMARY OF THE INVENTION

The present invention is directed to a system and method for a battery system adapter having a removable life extension device so that the entire system is not burdened with the size or weight of the device, or even the cost of the device, when the system is running with the proper high energy battery chemistry, such as a lithium ion battery.

Examples of a battery life extension devices are a capacitor, an ultra capacitor, or a super capacitor connected in parallel with the battery source. Such capacitance can add undesired cost and weight to a camera and typically would not be included with the camera. However, such a capacitor would improve battery life significantly when a user wishes to use standard AA batteries in the camera.

One embodiment of the invention provides for the optional use of a high capacitance ultra capacitor connectable across the AA batteries. This system then gives the user the flexibility to be able to buy batteries anywhere and yet have them perform better than they would otherwise in a system where a higher energy lithium ion battery is more appropriate.

In one embodiment, the battery system would include a battery carrier (sized for one or more AA batteries) which would be inserted into the camera (or other device that it is used in) and which would take the place of the lithium ion battery. The ultra capacitor would be optionally included in the battery carrier. The option to add the capacitor (or other life extending device) would reside with the user.

In an alternate embodiment, a separate slot could be constructed to optionally receive the capacitor.

DETAILED DESCRIPTION

Figure 1:
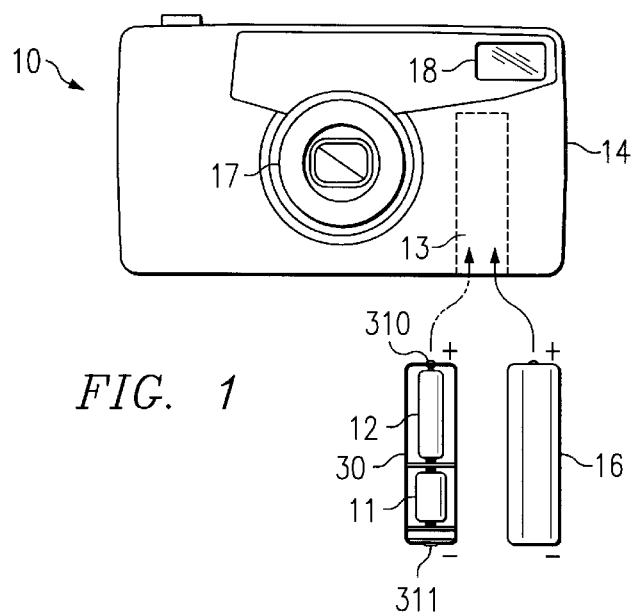
FIG. 1 shows a piece of equipment, such as a camera, adapted to receive either its original power source or an alternate battery carrier, the battery carrier having provision for the inclusions of a capacitor.
Figure 2:
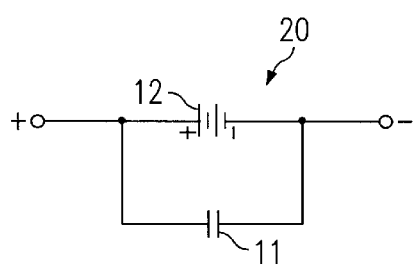
FIG. 2 shows the electrical circuit for battery life extension.

As shown in FIGS. 1 and 2, capacitor 11 is connected in parallel with battery 12 within battery carrier 30 to form power system 20 (FIG. 2). Battery carrier 30 then may be inserted into slot 13 of camera 14. Slot 13 is the slot into which the normal battery, for example, lithium ion battery 16 (shown removed) would be inserted. Camera 14 is shown with lens 17 and flash 18 and of course can be equipped, as is well-known in the art, with numerous other features and functions. As discussed, the concepts of this invention can be used with any device requiring battery power.

FIG. 2 shows the actual electrical circuit where capacitor 11 helps provide the pulsed high current load that battery (batteries) 12 sees. For example, assume capacitor 11 is a 10 farad capacitor and upon operation of the camera a 6 watt load across battery 12 suddenly appears. Instead of battery 12 having to respond to that load by supplying all of the electrons, some of the electrons would come from the charge stored by the 10 farad capacitor. Thus, capacitor 11 (sometimes called an ultra capacitor) would act as sort of a reservoir that has been charged up at a slow rate so as to preserve the life of battery 12. Thus, during short duration loads, the ultra capacitor supplies some of the instantaneous demand, thereby reducing the load that the batteries see by a couple of watts. This, then, has the effect of significantly extending the useful life of battery 12 if the battery chemistry is such that high loads decrease overall capacity. All common AA chemistries are in this category to some degree, with alkaline batteries being affected most.

For alkaline batteries, using the ultra capacitor circuit (or an equivalent thereof) under some circumstances will double the life of an alkaline AA battery pair. On nickel metal hydride and lithium-iron disulfide, the improvement can be in the order of 20% to 30%.

In operation, lithium ion battery 16 is longer than AA batteries are, so capacitor 11 can be fitted into the gap left when AA battery (batteries) is inserted instead of battery 16. It is intended that the insertion of capacitor 11 be optional with the use of AA batteries. Thus, holder 30 should be constructed such that a user can, if he/she desires, insert capacitor 11 into a receptacle in holder 30 (shown in FIG. 3). In this manner it is the user who decides if he/she desires to spend the extra money for extra battery life. The user then would select the level of performance desired and wouldn't have to pay for extra performance in the base model of the camera if such performance was not desired. Thus, if a user never intends to use AA batteries, or if the user is not concerned with battery life for such AA batteries, capacitor 11 would not be required, but could be added at any time. Also, different carriers could be made for a product such that the user would buy a complete unit with or without the capacitor.

The best mode contemplated for capacitor 11 is a single chemical ultra capacitor which is available in high capacitance in a fairly small volume.

Figure 3:
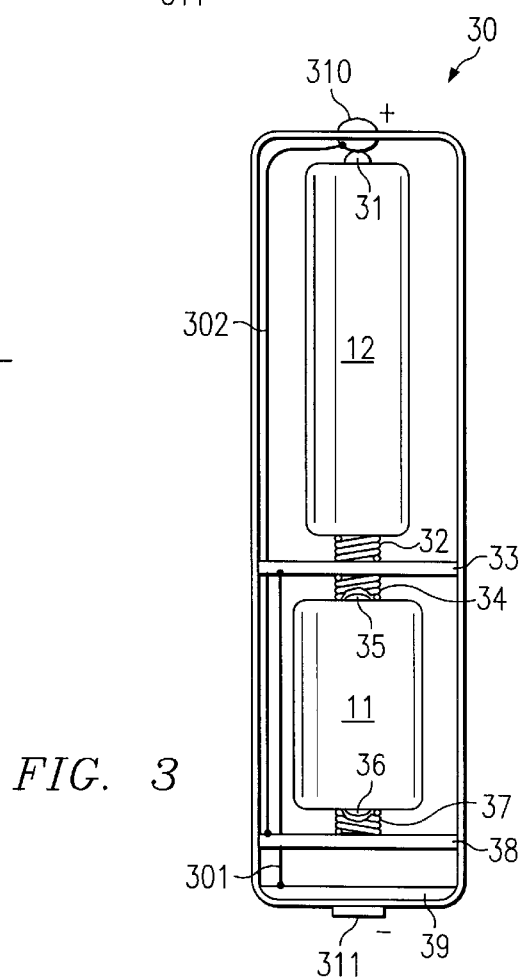
FIG. 3 shows one embodiment of a battery carrier having a compartment for receiving a battery life extension device.

FIG. 3 shows one embodiment of battery holder 30 where capacitor 11 is optional. In this embodiment, housing 30 has contact 310 which is typically pressure connected to plus terminal 31 of battery 12. Minus terminal 32 of battery 12 is connected by a spring to barrier 33 which, can advantageously be electrically conductive. Capacitor 11, if present, has one end 35 physically and electrically connected by spring 34 to barrier 33 and has its other end 36 physically and electrically connected to barrier 38 by spring 37. Wire 302 connects positive terminal 31 to terminal 36 of capacitor 11 (if present) via electrically conductive barrier 38, while wire 301 connects negative terminal 32 of battery 12 to end barrier 39 so as to supply power to the device (camera 14) to which holder 30 is inserted via tab 311.

Note that while battery holder 30 is shown open on top, it, of course, could be designed as a closed device, perhaps with the battery inserted from one end and the capacitor (or other battery life extending device) inserted optionally from the other end. Also, the equipment using the power (such as a camera) could be designed with a first receptacle for the battery and a second receptacle for the capacitor, the important thing being that the electrical connection is properly made and that addition of the battery life extending device is optional. Upon inserting the capacitor into the auxiliary receptacle, the receptacle is sealed (temporarily) by the user and the capacitor becomes electrically connected in parallel to the existing battery by wires, or other electric current carrying elements, extending from the auxiliary receptacle to the battery.

What is claimed is:

1. A battery holder for substitution of a first power source with a second power source, said battery holder comprising:
    a first compartment for holding a battery; and
    a second compartment for holding an element for prolonging the useful life of a battery in said first compartment, said second compartment adapted for allowing said element to be user selectively installed therein and wherein said battery holder will supply power from said battery even when said element has not been installed.

2. A battery holder of claim 1 wherein said first power source is a battery having a particular chemistry and wherein said battery installed in said first compartment has a chemistry different from said particular chemistry of said first power source battery.

3. A battery holder of claim 1 wherein said element is a capacitor.

4. A battery holder of claim 3 wherein said capacitor has sufficient capacitance to prolong the life of said battery installed in said first compartment when high instantaneous loads are applied to said installed battery.

5. A battery holder of claim 4 wherein said capacitance is approximately 5–10 farrads.

6. A battery holder of claim 1 wherein said second compartment is designed to electrically couple an installed element in parallel with said battery in said first compartment.

7. A battery holder of claim 1 wherein said battery holder has a physical size substantially similar to the size of said first power source.

8. A method of substituting a secondary power source for a primary power source where the two power sources have different operating characteristics, said method comprising the steps of:
    removing said primary power source from a battery location having a particular size;
    inserting into said battery location a holder having contained within said holder said secondary power source, said holder having substantially said particular size; and
    user selectively positioning within said holder a high capacitance capacitor electrically connected in parallel with said secondary power source.

9. The method of claim 8 wherein said secondary power source is a battery.

10. The method of claim 9 wherein said battery is a general purpose battery.

11. The method of claim 9 wherein said primary power source is a battery having a different chemistry from said secondary power source battery.

12. The method of claim 11 wherein said primary power source is a lithium metal primary or lithium ion battery.

13. An alternative power source for use in equipment, said source optionally connectable to said equipment, said power source comprising
    means for supporting said alternative power source when said source is removed from said equipment, said supporting means including means for accepting said alternative power source and accepting a separate device;
    means for electrically connecting an accepted separate device in parallel with said alternative power source; and
    means for connecting said alternative power source to said equipment when said supporting means is used with said equipment.

14. The alternative power source of claim 13 wherein said equipment includes a receptacle for accepting said alternate power source, said receptacle having a specific physical structure and wherein said supporting means has a physical structure for properly mating with said receptacle.

15. The alternative power source of claim 14 wherein a primary power source of said equipment has a physical structure for properly mating with said receptacle, and wherein said primary power source and said supporting means are physically interchangeable with said receptacle.

16. The alternative power source of claim 15 wherein said primary power source is a lithium metal primary or lithium ion battery.

17. The alternative power source of claim 13 wherein said alternative power source is at least one nickel metal hydride, alkaline, or lithium-iron disulfide battery.

18. The alternative power source of claim 13 wherein said separate device is a capacitor.

19. The alternative power source of claim 18 wherein said capacitor has relatively high capacitance.

20. The alternative power source of claim 18 wherein said capacitor is a small volume chemical capacitor.

21. A method of adding life to battery powered equipment, said method comprising the steps of:

inserting into a receptacle in said equipment, a high energy capacitor; and temporarily locking said inserted capacitor into said equipment so that said capacitor becomes temporarily electrically connected in parallel with a battery powering said equipment.

22. The method of claim 21 wherein said capacitor is a chemical capacitor.

23. The method of claim 21 wherein said equipment receptacle is only temporarily positioned in juxtaposition with said equipment.

* * * * *